US011449083B2

(12) United States Patent
Engel et al.

(10) Patent No.: US 11,449,083 B2
(45) Date of Patent: Sep. 20, 2022

(54) EVALUATING ENHANCED OIL RECOVERY METHODS

(71) Applicant: International Business Machines Corporation, Armonk, NY (US)

(72) Inventors: Michael Engel, Rio de Janeiro (BR); Rodrigo Neumann Barros Ferreira, Rio de Janeiro (BR); Ronaldo Giro, Rio de Janeiro (BR); Mathias B Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/984,209

(22) Filed: Aug. 4, 2020

(65) Prior Publication Data

US 2022/0043468 A1 Feb. 10, 2022

(51) Int. Cl.
  *G05D 7/06* (2006.01)
  *G05B 15/02* (2006.01)
  (Continued)

(52) U.S. Cl.
  CPC ......... *G05D 7/0676* (2013.01); *E21B 49/008* (2013.01); *G01V 1/28* (2013.01); *G05B 15/02* (2013.01)

(58) Field of Classification Search
  CPC ...... E21B 49/008; E21B 43/16; E21B 43/162; G01V 1/28; C09K 8/58; C09K 8/584
  See application file for complete search history.

(56) References Cited

U.S. PATENT DOCUMENTS 5,758,727 A * 6/1998 Moulu ................. E21B 43/162
                                                166/401
9,310,285 B1    4/2016 Avouris
                (Continued)

FOREIGN PATENT DOCUMENTS

EP       24161521 A1    2/2012
GB       2558154 B     12/2018
              (Continued)

OTHER PUBLICATIONS

Hendraningrat et al., Improved Oil Recovery by Nanofluids Flooding: An Experimental Study, Dec. 10, 2012, SPE Kuwait International Petroleum Conference and Exhibition, (Abstract Only), ISBN: 978-1-61399-263-0 (Year: 2012).*

(Continued)

*Primary Examiner* — Mischita L Henson
(74) *Attorney, Agent, or Firm* — David K. Mattheis; Maeve Carpenter (57) ABSTRACT

Evaluating enhanced oil recovery methods by identifying a first nanofluidic device associated with a reservoir rock formation and saturated with a target fluid, directing the injection of a secondary recovery fluid into the first nanofluidic device, determining a target fluid secondary recovery saturation level associated with injection of the secondary recovery fluid into the first nanofluidic device, identifying a second nanofluidic device associated with the reservoir rock formation and saturated with the target fluid, directing the injection of a tertiary recovery fluid into the second nanofluidic device, determining a target fluid tertiary recovery saturation level associated with the injection of the tertiary recovery fluid into the second nanofluidic device, determining a target fluid production efficiency associated with the tertiary recovery fluid, and providing the target fluid production efficiency to a user.

20 Claims, 3 Drawing Sheets

(51) Int. Cl.
*E21B 49/00* (2006.01)
*G01V 1/28* (2006.01)

(56) References Cited

U.S. PATENT DOCUMENTS

| | | | |
|---|---|---|---|
| 9,488,586 B2 | 11/2016 | He | |
| 9,702,748 B2 | 7/2017 | Engel | |
| 9,759,643 B2 | 9/2017 | Avouris | |
| 9,891,084 B2 | 2/2018 | Engel | |
| 9,891,294 B2 | 2/2018 | Engel | |
| 9,892,225 B2 | 2/2018 | Tirapu Azpiroz | |
| 10,071,375 B2 | 9/2018 | Azpiroz | |
| 10,235,489 B2 | 3/2019 | Tirapu Azpiroz | |
| 10,281,397 B2 | 5/2019 | Sieben | |
| 10,343,162 B2 | 7/2019 | Azpiroz | |
| 10,436,003 B2 | 10/2019 | Kim | |
| 2010/0276146 A1* | 11/2010 | Smith | E21B 43/16 166/302 |
| 2014/0024073 A1 | 1/2014 | Zhdaneev | |
| 2015/0225639 A1* | 8/2015 | Khosravani | G01N 33/24 73/152.09 |
| 2017/0058186 A1* | 3/2017 | Oghena | C09K 8/588 |
| 2017/0082551 A1 | 3/2017 | Mackay | |
| 2018/0253514 A1 | 9/2018 | Bryant | |
| 2018/0276563 A1* | 9/2018 | Bryant | C09K 8/58 |
| 2019/0024487 A1* | 1/2019 | Zhang | C09K 8/58 |
| 2019/0049847 A1 | 2/2019 | Cha | |
| 2019/0218897 A1 | 7/2019 | Chandler | |

FOREIGN PATENT DOCUMENTS

| | | |
|---|---|---|
| WO | 2015152942 A1 | 10/2015 |
| WO | 2018085782 A1 | 5/2018 |

OTHER PUBLICATIONS

Bila et al., Experimental Investigation of Polymer-Coated Silica Nanoparticles for Enhanced Oil Recovery, May 31, 2019, Nanomaterials, 9(6), 822, Digital Object Identifier: 10.3390/nano9060822 (Year: 2019).*

Tayfun Babadagli et al., Mature Field Development—A Review, Jun. 13-16, 2005, SPE Europec/EAGE Annual Conference, Madrid, Spain, SPE-93884-MS, pp. 1-20 (Year: 2005).*

"Multi-Well Trial Demonstrates Enhanced Productivity Using RockOn® Surfactant—Rock-On-A-Chip™ Microfluidic Device Efficiently Evaluates Relative Effects of Surfactants in the Lab", Texas, United States, 2 pages, © 2018 Halliburton.

Fan et al., "Low-cost PMMA-based microfluidics for the visualization of enhanced oil recovery", Oil & Gas Science and Technology—Rev. IFP Energies nouvelles 73, 26 (2018), Accepted: Jun. 18, 2018, Copyright Y. Fan et al., published by IFP Energies nouvelles, 2018, 7 pages, <https://doi.org/10.2516/ogst/2018026>.

Gogoi et al., "Review on microfluidic studies for EOR application", Journal of Petroleum Exploration and Production Technology (2019) 9:2263-2277, Accepted: Jan. 8, 2019 / Published online: Jan. 14, 2019, 15 pages, <https://doi.org/10.1007/s13202-019-0610-4>.

Gunda et al., "Reservoir-on-a-Chip (ROC): A new paradigm in reservoir engineering", Lab Chip, 2011, 11, 3785, Accepted Sep. 13, 2011, 9 pages, DOI: 10.1039/c1lc20556k.

Rosero et al., "Design and analysis of different models of microfluidic devices evaluated in Enhanced Oil Recovery (EOR) assays", revista Matéria, V.23, N.02, ISSN 1517-7076 artigo e-12129, 2018, Accepted on: Mar. 15, 2018, 10 pages.

* cited by examiner

EVALUATING ENHANCED OIL RECOVERY METHODS

BACKGROUND

The disclosure relates generally to evaluating enhanced oil recovery (EOR) methods. The disclosure relates particularly to evaluating EOR production in terms of the target fluid saturation levels.

The global average oil Recovery Factor (RF)—the portion of oil actually produced from a reservoir—is only around 20-40%. A possible reason for such a low RF might be that Enhanced Oil Recovery (EOR) techniques are not yet broadly applied, and the extraction of the oil is mainly focused on the primary and secondary recovery stages.

During the primary recovery stage, the natural pressures in the oil reservoir are enough to force the oil to the surface. In this stage the RF is around 5-15%. When the reservoir pressures fall, secondary recovery methods are applied. These rely on injecting fluids to increase reservoir pressure. These fluids encompass water injection (also known as "waterflooding"), steam injection, natural gas re-injection, air injection and carbon dioxide injection. During this stage the RF is around 35-45%.

The Enhanced Oil Recovery, or tertiary oil recovery methods are applied after secondary production yields fall. EOR methods are applied to increase the mobility of oil in order to increase the oil extraction, i.e., the RF. Considering the variety of tertiary recovery methods and the associated recovery fluid and additive combinations, it is difficult to determine the relative recovery performance for each possible method in a given reservoir and to quantify the production efficiencies and potential reservoir damage associated with any particular recovery method.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable evaluation of EOR methods.

Aspects of the invention disclose methods, systems and computer readable media associated with evaluating enhanced oil recovery methods by identifying a first nanofluidic device associated with a reservoir rock formation and saturated with a target fluid, directing the injection of a secondary recovery fluid into the first nanofluidic device, determining a target fluid secondary recovery saturation level associated with injection of the secondary recovery fluid into the first nanofluidic device, identifying a second nanofluidic device associated with the reservoir rock formation and saturated with the target fluid, directing the injection of a tertiary recovery fluid into the second nanofluidic device, determining a target fluid tertiary recovery saturation level associated with the injection of the tertiary recovery fluid into the second nanofluidic device, determining a target fluid production efficiency associated with the tertiary recovery fluid, and providing the target fluid production efficiency to a user. Disclosed systems and methods provide a quantitative analysis of Enhanced Oil Recovery efficiency, including the cost impact of using different recovery materials. This is achieved by a sequence of physical analysis steps combining digital rock tomography imaging, rock-on-a-chip experiments, computational image processing and a cost analysis based upon enhanced recovery method efficiencies—how effectively each EOR method displaces the target fluid from the formation. Disclosed embodiments enable production costs determinations associated with attaining post-recovery method target fluid saturations in the reservoir—determining the best-case recovery factor for the target fluid for each tested recovery method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Disclosed systems and methods enable the assessment of EOR efficiency by measuring oil displacement in real-time, taking experimental flow measurements in sub-micron and nanoscale capillaries, assessing EOR impact to flow assurance in porous media due to molecules of EOR material adsorbing to the solid surface, therefore clogging the capillary, measuring formation wettability changes associated with EOR fluids, measuring solid dissolution/precipitation, and performing microscopic examination of all processes involved, allowing for cause-effect determination.

In an embodiment, one or more components of the system can employ hardware and/or software to solve problems that are highly technical in nature (e.g., controlling the injection of fluids into nonfluidic devices, measuring nanofluidic device outputs, capturing and correlating images as fluid injection occurs, determining target fluid saturations levels, determining target fluid production costs, etc.). These solutions are not abstract and cannot be performed as a set of mental acts by a human due to the processing capabilities needed to facilitate EOR method evaluation, for example. Further, some of the processes performed may be performed by a specialized computer for carrying out defined tasks related to control of fluid injection into nanofluidic devices. For example, a specialized computer can be employed to carry out tasks related to evaluating EOR methods, or the like.

In EOR screening evaluations, the method considers adding different materials to the injection (recovery) fluid, each one with different functional properties. Polymers can increase the viscosity of the injected water. Surfactants can decrease the interfacial tension between water and oil. Nanoparticles can decrease the interfacial tension between water and oil as well as change the wettability of the solid surface. Each one of these changes in the physical behaviour of the multiphase flow can lead to different recovery factors.

High viscosity injection fluids lead to increased sweep efficiency, reducing viscous fingering. Lower interfacial tension reduces capillary trapping, increasing oil mobility. Wettability changes from oil-wet to water-wet help oil mobilisation. The nature of each EOR material may pose different challenges to flow assurance. Polymers, which are long chained molecules, can entangle and obstruct narrow pores. Surfactants can, in high concentration, form micelles and stop decreasing interfacial tension. Nanoparticles can agglomerate, precipitate, adsorb to the surface, etc. all leading to obstruction of narrow pores. Therefore, the choice of different materials results in different costs associated with an EOR operation. Production engineers need to take all of that into account in the decision-making process.

In an embodiment, the method obtains a three-dimensional nano structural representation of the relevant reservoir rock formation. In this embodiment, a Focused Ion Beam Scanning Electron Microscopy (FIB-SEM) or a Computerized Tomography (CT) scan of a reservoir rock sample provides formation details including formation porosity, capillary diameter, capillary distribution and 3D reservoir rock morphology.

A rock-on-a-chip structure includes a recreation of a slice of the reservoir rock tomography from the 3D scan, built upon a silicon, or similar semiconductor material, substrate using semiconductor device lithography and etching techniques including the use of a mask derived from the reservoir rock 3D scan. The thickness of the 3D scan slice may range from about 1 to about 100000 micrometers.

Rock-on-a-chip fabrication uses typical state of the art semiconductor integrated circuit fabrication techniques (e.g., CMOS chip fabrication) to form a template or templates and sufficient wiring and analysis support circuitry. The template has physical patterns that represent formation porosity of a geologic sample. Once formed and verified/validated, the template enables the simulation of fluid flow through fluid channels representative of the geological sample. Typically, the fully formed template structure is capped with a transparent capping layer. The transparent capping layer enables optical image capture and associated fluid flow analysis. Thus, the rock-on-a-chip enables fluid flow analysis through a defined space with defined properties, and experimental validation of the results on a wide range (orders of magnitude) of scale lengths under well-defined laboratory conditions, ranging from nanometers (nm) to millimeters (mm).

Completed preferred rock-on-a-chip assemblies include patterned two-dimensional (2D) lattice structures, electrically controlled for providing functionalities such as local heating and light emission/detection for integrated optical measurement such as chemical and biological sensing. Moreover, the 2D structures provide for controlling and monitoring liquid to solid interface surface interaction for experimentally validating and controlling surface wetting properties. Thus, the present invention integrates electrically conducting, flexible, optically transparent, ultrathin 2D materials in a fully scalable fluidic chip platform that also may be rigid or flexible. The final, preferred rock-on-a-chip results provide a basis for scaling strategies for propagating flow properties to desired lengths and scales, e.g., for oil reservoir models from the nanometer (nm) scale to the macro (six orders of magnitude larger) scale.

The substrate layer may be any suitable material, or optionally, omitted. The surface layer also may be any suitable material, e.g., glass, quartz, silicon carbide (SiC), silicon nitride (Si3N4), or plastics. The channels may be formed using lithographic techniques well known in the semiconductor manufacturing arts, e.g., soft mask or hard mask lithography. For example, the channels can be defined by optically or electron beam (e-beam) patterning a positive resist layer, e.g., polymethyl methacrylate (PMMA), Hydrogen silsesquioxane (HSQ), or S1818™; removing unexposed (or exposed) areas of the resist film; and etching the open areas of the surface layer. Thus, the mask layer may be a soft mask layer or a hard mask layer, e.g., oxide, nitride, or deposited metal. The cavity etch may be a suitable dry etch (e.g., O2 and CHF3) or a suitable wet etch (e.g., hydrofluoric acid) and lift-off.

Optionally, micro-particles/nano-particles or continuous or patterned thin films (not shown) deposited on cavity sidewalls and/or floors, modify the respective surfaces. These optional surface patterns add surface interaction while maintaining the channel optical transparency for optical inspection. Thus, sidewall or floor features provide multiphase flow patterns with wettability properties (hydrophilic/hydrophobic) based on the surface coatings used. Typical suitable such particles or thin films include dielectrics such as silicon dioxide (SiO2), aluminum oxide (Al2O3), hafnium (IV) oxide (HfO2), mono-layers/multi-layers of molecular compounds, and two-dimensional lattice structures, e.g., a single or a multilayer graphene, transition metal dichalcogenides, or black phosphorus.

Robust rock-on-a-chip capability includes localized heating for facilitating droplet movement and/or thermal cycling; on-chip light sources; and on-chip light detectors, and sensors. Thus preferably, the analysis support circuitry is optoelectronic and provides localized heating, light emission and detection in suitable mono-atomic, 2D lattice structures, e.g., single-layer or multi-layer organic and inorganic materials. Suitable optoelectronic circuits may include transparent 2D carbon lattice electrodes, e.g., graphene, for facilitating droplet actuation, flow sensing, and chemical/bio-sensing. Suitable circuit materials include, for example, graphene, transition metal dichalcogenides and black phosphorus. Regular arrays and random networks/thin films of quasi-one-dimensional lattice structures, such as organic and inorganic nanotubes/nanowires, combine to form the 2D lattice structures.

In an embodiment, the slice details correspond to the 3d scan details of the reservoir rock sample. In an embodiment, the 3D scan slice details are analyzed to determine average reservoir rock formation details relating to formation porosity and capillary size; in this embodiment, the rock-on-a-chip mask includes regularly spaced pillars of material to yield a periodic structure on the chip which has the same average porosity and capillary size as the reservoir sample. The resulting structure includes mmicrofluidic channels filled with an array of nanopillars. Pillar diameter, lateral pitch, cross-sectional geometry and grid placement are tuned to match porosity and surface-to-volume ratio of target rock.

In an embodiment, the rock-on-a-chip includes a regularly spaced pattern of capillary pathways sized in accordance with the distribution of capillary sizes of the reservoir sample. In an embodiment, the rock-on-a-chip includes a 3D layered capillary network derived using an algorithm such as the Sugiyama Layout algorithm and the porosity and capillary data from the reservoir sample scan analysis.

In any embodiment, multiple copies of the reservoir rock rock-on-a-chip are fabricated for evaluating the respective recovery methods. Evaluation of secondary recovery—water flooding—and each tertiary recovery method utilizes a different copy of the rock-on-a-chip. The nanofluidic devices include a clear top layer, such as an anodically bonded glass cover, sealing the device and allowing optical imaging and associated analysis of multi-phase fluid flow through the devices. The device may include heating elements to enable simulation of reservoir thermal conditions, as well as microfluidic fluid injection systems, such as syringe systems of microfluidic pumps, enabling the separate injection of target and recovery fluids into the devices.

In an embodiment, the system includes an optical microscope together with light sources, optical filters and beam splitters, as well as digital imaging cameras to capture both single images as well as image sequences as fluids flow through the devices.

In an embodiment, the method saturates a nanofluidic device with a first phase of material (the target fluid) utilizing the target fluid injection system described above. In this embodiment, the target fluid corresponds to the actual reservoir fluid—either actual reservoir production samples or synthetic hydrocarbon mixtures prepared to simulate the actual reservoir fluids are used. The system injects target fluid to fully saturate the nanofluidic device with the target fluid. The method monitors the progression of target fluid into the nanofluidic device using the optical image capture system. The images show contrast changes as the target fluid fills the pores of the device.

In an embodiment, the method first saturates the device with water or brine and then displaces the water or brine with the target fluid. In this embodiment, the method simulates the irreducible water saturation of the formation.

After saturating the device with the target fluid, the method injects a second fluid—water, brine, or tertiary recovery fluid, displacing the target fluid from the device pores. At least one of the target fluid and the second fluid contains a contrast agent—such as a fluorescent dye of fluorescent beads—to better enable the optical analysis of the target fluid displacement by the second fluid. The method may inject a predetermined volume of the recovery fluid—associated with the total pore volume of the nanofluidic device—or the method may inject the recovery fluid for a predetermined amount of time associated with achieving a steady state where no further target fluid production occurs. The method may inject fluid until image contrast analysis indicates no further target fluid production from the nanofluidic device.

In an embodiment, the method utilizes an optical microscope coupled with one or more cameras is acquiring images and capturing the entire process using beam splitters and optical filters to discern between the target fluid and the recovery fluid.

In an embodiment, the method extracts experimental saturation curves based on image analysis of the acquired image stack. The method segments all images in the image stack based upon image contrast provided by the contrast agent. The method determines relative saturation based on integrated intensity per image (sum of bright/dark pixels for each image in a series) and correlates the analysed images to an injection timeline or injected volume of the second fluid to yield the saturation/drainage curves.

In an embodiment, the method determines the experimental flow velocity fields based on image analysis of the acquired image stack. The method segments all images in the image stack, based upon image contrast changes provided by the contrast agent. The method determines flow velocity fields based on Particle Image Velocimetry (PIV) or Particle Tracking Velocimetry (PTV). The method correlates the analyzed images to an injection timeline or injected volume of the recovery fluid, yielding saturation/drainage curves, flow velocity distribution and clogging areas in the formation. PIV and PTV provide flow velocity inside each channel. Integration of velocity field at inlet (outlet) area provides injected (produced) flow rate. Integration of injected (produced) flow rate over time provides injected (produced) volume. Analysis of flow velocity fields of tertiary recovery fluid injections provides an indication of potential formation damage (capillary clogging) due to absorption, or adsorption of EOR materials upon formation capillary walls, or changes of formation wettability parameters due to EOR fluids. Clogged capillaries show zero or low fluid flow velocities, indicated by no contrast changes in the regions across a succession of images.

Experimental data typically include spatially distributed flow speed vectors. By integrating the flow speed vectors of phase a (ex: water or oil) over the cross-sectional area of a given region (ex: inlet or outlet), the method obtains the flux (flow rate) of phase a in that region.

$$Q_{\alpha,i} = \iint_{inlet} \vec{v}_\alpha \cdot d\vec{S}$$

$$Q_{\alpha,p} = \iint_{outlet} \vec{v}_\alpha \cdot d\vec{S}$$

The method calculates the accumulated volume of fluid that is injected (produced) by integrating the flux injected (produced) at the inlet (outlet) as a function of time.

$$V_{\alpha,i}(t) = \int_0^t Q_{\alpha,i}(t')dt' \text{ for the inlet, and}$$

$$V_{\alpha,p}(t) = \int_0^t Q_{\alpha,p}(t')dt' \text{ for the outlet.}$$

The method determines the fluid saturation (volume fraction of each fluid) by counting pixels of a given colour, provided fluids can be distinguished optically, or by accumulating the injected and produced volumes of each phase. The saturation of each fluid as a function of the injected fluid volume provides a metric for the recovery efficiency. The method expresses the injected fluid volume in terms of the (total) pore volume PV. The plateaus in calculated fluid saturations provide the recovery factors.

$$S_\alpha(t) = \frac{V_\alpha(t)}{PV}, S_\alpha(t) = S_\alpha(0) + \frac{V_{\alpha,i}(t) - V_{\alpha,p}(t)}{PV}$$

for the injected water phase (secondary production), $V_{w,i}(t) = Q_{pump}t$; and $V_{w,p}(t) = Q_{pump}t + PV[S_w(0) - S_w(t)]$ for the oil recovered due to secondary or tertiary recovery methods, $V_{o,i}(t) = 0$; and $V_{o,p}(t) = PV[S_o(0) - S_o(t)]$ In an embodiment, the method simplifies the analysis by assuming $S_w(0) = 0$ and $S_o(0) = 1$.

The method determines the total cost of the waterflooding operation per volume of oil produced (relative to the pore-scale) as:

$$C_{WF} = \frac{V_{w,i}^{WF} C_{w,i} + V_{w,p}^{WF} C_{w,p} + V_{o,p}^{WF} C_{o,p}}{C_{o,p}^{WF}}$$

where:
$C_{o,p}$ Cost of oil production
$C_{w,p}$ Cost of water production
$C_{w,i}$ Cost of water injection
$Q_{w,i}^{WF}$ Instantaneous flux of water injected during waterflooding
$Q_{w,p}^{WF}$ Instantaneous flux of water produced during waterflooding $Q_{o,p}^{WF}$ Instantaneous flux of oil produced during waterflooding
$V_{w,i}^{WF}$ Accumulated volume of water injected after waterflooding
$V_{w,p}^{WF}$ Accumulated volume of water produced after waterflooding, and
$V_{o,p}^{WF}$ Accumulated volume of oil produced after waterflooding The method determines the total cost of the Enhanced Oil Recovery operation per volume of oil produced (relative to the pore-scale) and relative efficiency $\Delta$, as:

$$C_{EOR} = \frac{V_{w,i}^{EOR}C_{w,i} + V_{w,p}^{EOR}C_{w,p} + V_{o,p}^{EOR}C_{o,p} + V_{w,i}^{EOR}\rho_w \epsilon (1+\gamma)C_{mat}}{V_{o,p}^{EOR}}$$

where:

$$\Delta = \frac{V_{o,p}^{EOR} - V_{o,p}^{WF}}{V_{OOIP}}$$

$$\Delta = \frac{S_O^{WF} - S_O^{EOR}}{S_O^{WF}(0)}$$

$C_{o,p}$ Cost of oil production
$C_{w,p}$ Cost of water production
$C_{w,i}$ Cost of water injection
$C_{mat}$ Cost of EOR material
$\epsilon$ Target wt % of EOR material
$\gamma$ Retention rate of EOR material
$\rho_w$ Water density
$Q_{w,i}^{WF}$ Instantaneous flux of water injected during EOR
$Q_{w,p}^{WF}$ Instantaneous flux of water produced during EOR
$Q_{o,p}^{WF}$ Instantaneous flux of oil produced during EOR
$V_{w,i}^{WF}$ Accumulated volume of water injected after EOR
$V_{w,p}^{WF}$ Accumulated volume of water produced after EOR, and
$V_{o,p}^{WF}$ Accumulated volume of oil produced after EOR In an embodiment, the method provides the output of the cost analysis to the end user in the form of graphs, tables, a single number, or a combination of these via a user interface. The cost analysis can be presented as the cost per volume of oil for each recovery strategy, the additional cost per volume of oil for EOR with respect to waterflooding, or the ratio between the cost of recovery operation and the oil price. The recovery efficiency analysis can be presented as the fraction of remaining oil in place for each recovery strategy, the relative increase in recovery due to EOR with respect to waterflooding, or the relative increase in recovery due to EOR with respect to waterflooding per additional cost employed.

Figure 1:
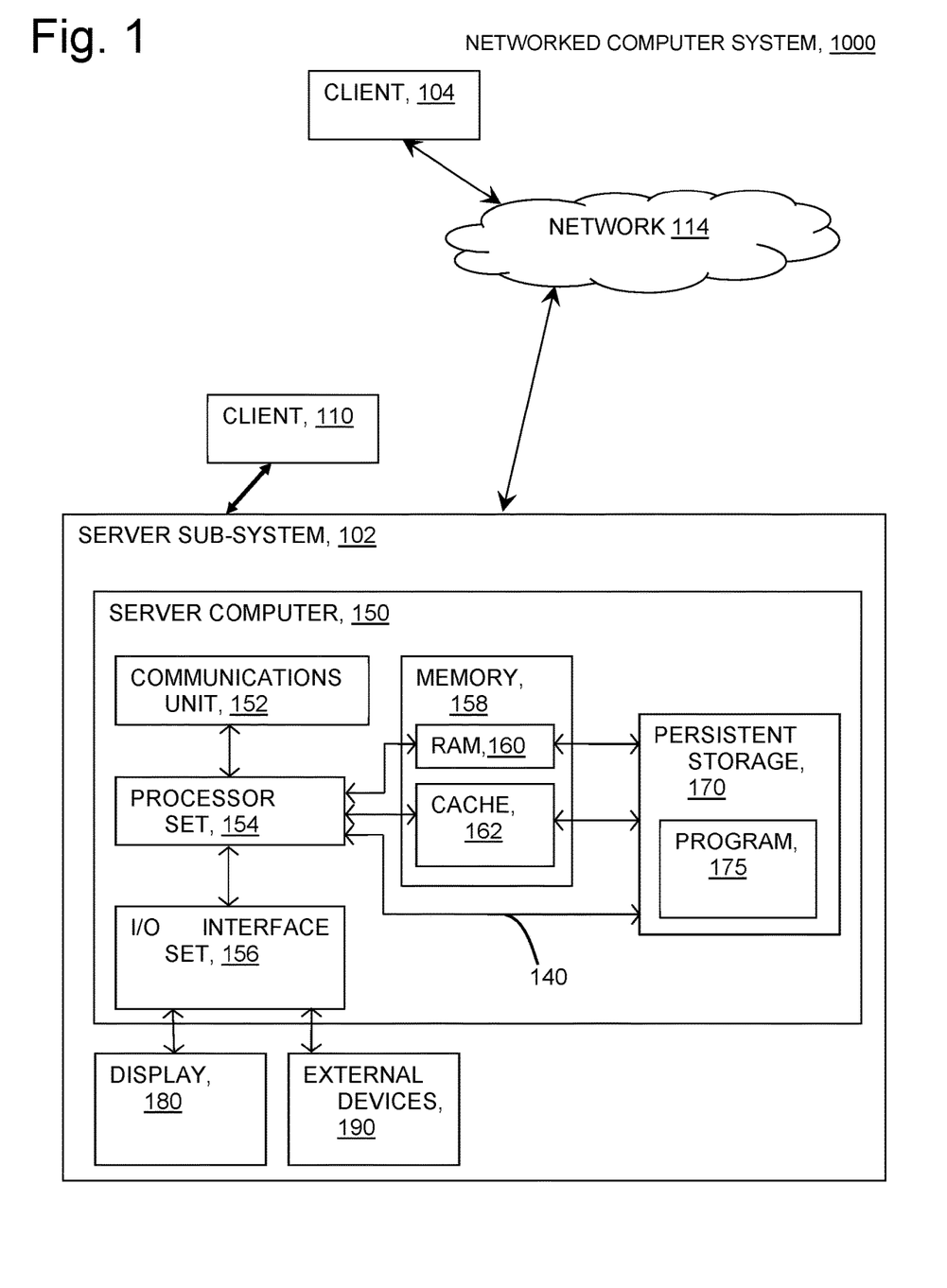
FIG. 1 provides a schematic illustration of a computing environment, according to an embodiment of the invention.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 include EOR evaluation program (not shown) together with sufficient computing resource (processor, memory, network communications hardware) to execute the program. Client devices 104 and 110 include computing devices controlling the fluid injection systems as well as the image capture systems monitoring fluid injection progress within the rock-on-a-chip devices. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the EOR evaluation program 175, are stored in persistent storage 170 for execution and/or access by one or more of the respective processor(s) 154 of server computer 150 via cache 162. Execution of EOR evaluation program 175 by the processor includes analysis of the captured images of the fluid injection progression within the rock-on-0a-chip devices. Program execution further includes determining fluid saturation levels for each of the target, secondary, and tertiary recovery fluids as well as production cost analysis based upon the fluid injection analysis. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., EOR evaluation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
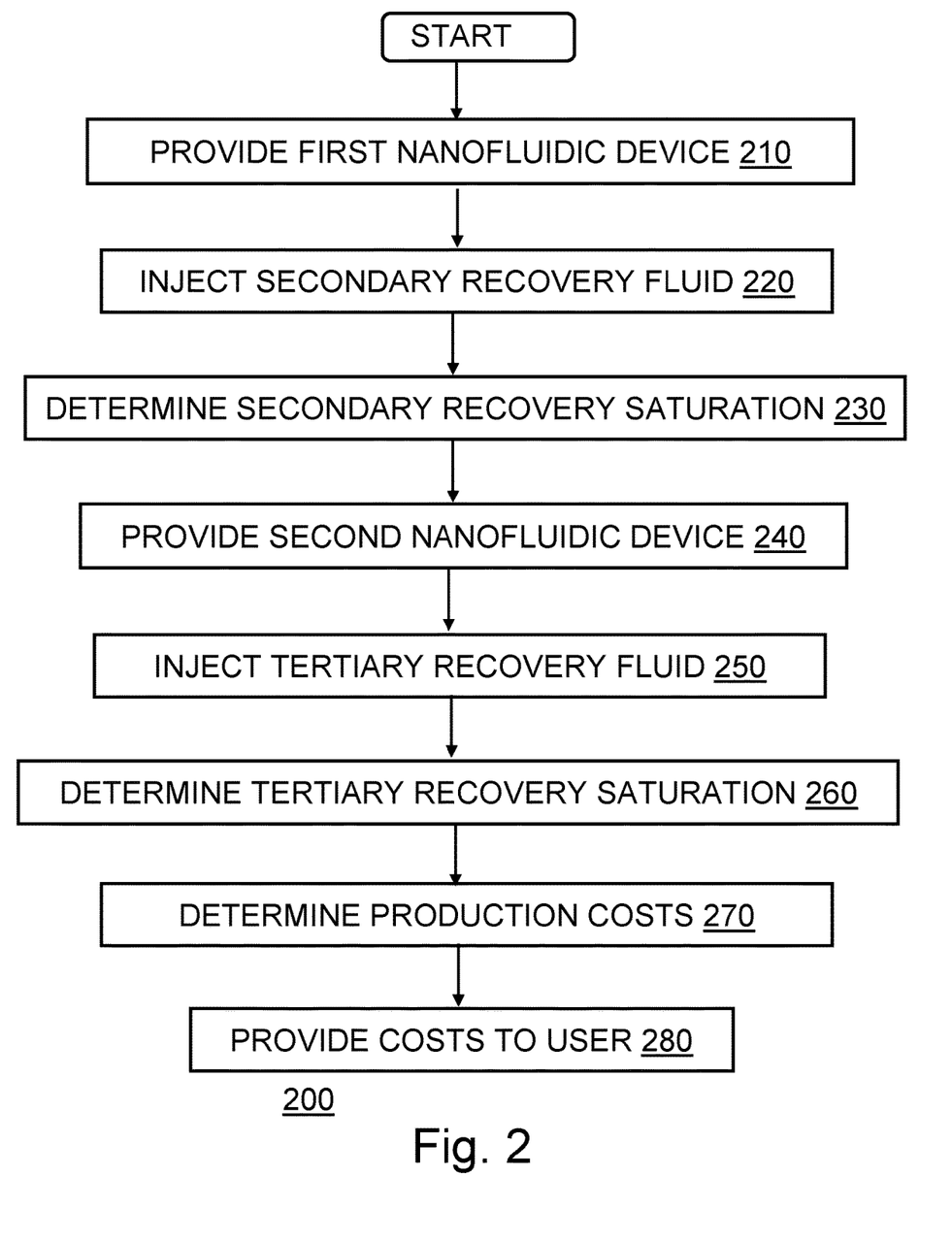
FIG. 2 provides a flowchart depicting an operational sequence, according to an embodiment of the invention.

FIG. 2 provides a flowchart 200, illustrating exemplary activities associated with the practice of the disclosure. After program start, at block 210, the method identifies a first nanofluidic device fabricated according to reservoir rock properties including porosity and capillary size. The first nanofluidic device may include a rock-on-a-ship device having a recreation of a slice of reservoir rock with data acquired from a FIB-SEM or CT scan of a reservoir rock sample and translated to a semiconductor device using known fabrication techniques. The nanofluidic device may include a plurality of pillars and spacers, replicating the average porosity and capillary size of the reservoir rock. The nanofluidic devices may include capillary channels derived using a Sugiyama Layout network projection algorithm and data from the scan of the reservoir rock sample. The nanofluidic devices include fluid injection systems for injecting at least two distinct fluid phases, as well as heating elements and valving to enabling the controlled inaction of fluid. The devices include a transparent, sealed cover, enabling optical observation and imaging of the progress of fluid injections.

In an embodiment, at the onset of an experiment, the method saturates each nanofluidic device with either a target fluid similar to the actual reservoir hydrocarbon mixture, or first saturates the device with water or brine and then displaces the water/brine with the target hydrocarbon fluid, saturating the device with the target fluid.

At block 220, the method directs the injection of a secondary fluid into a nanofluidic device saturated with the target fluid. The method may control the injection directly or direct and control a nanofluidic system injecting the fluid. During injection the method measures the volume of secondary fluid injected into the device and the amount of target fluid produced by the fluid injection. The method monitors the device and captures a series of images showing the progression of fluid injection and production. The method stops fluid injection after either a predetermined amount of time, a predetermined amount of injected fluid, or after reaching a steady state where no additional target fluid production occurs.

At block 230, the method analyses the captured image sequences and determines target fluid and secondary fluid saturation levels according to the contrast changes in the images captured during injection. The method also determines target and secondary fluid flow velocities during the injection from the image analysis. Integration of fluid flow velocities at inlet (outlet) area provides injected (produced) flow rate. Integration of injected (produced) flow rate over time provides injected (produced) volume.

At block 240, the method identifies a second nanofluidic device as described above with regard to block 210. The method saturates the second nanofluidic with the target fluid as described above.

At block 250, the method directs the injection of a tertiary recovery fluid into the second nanofluidic device, displacing and producing the target fluid from the device. The method may control the injection directly or direct and control a nanofluidic system injecting the fluid. The method controls and measures the amount of tertiary recovery fluid injected, measures the amount of target fluid produced and captures an image sequence of the interaction of the fluids and the device during the injection process. The method stops fluid injection after either a predetermined amount of time, a predetermined amount of injected fluid, or after reaching a steady state where no additional target fluid production occurs.

At block 260, The method analyses the captured image sequences and determines target fluid and tertiary fluid saturation levels according to the contrast changes in the images captured during injection. The method also determines target and tertiary fluid flow velocities during the injection from the image analysis. Integration of fluid flow velocities at inlet (outlet) area provides injected (produced) flow rate. Integration of injected (produced) flow rate over time provides injected (produced) volume.

At block 270, the method determines production costs associated with the secondary and tertiary recovery fluids according to the material costs, production volumes, etc., determined according to the image analysis for the secondary and tertiary fluid injection processes, as described above.

In determining secondary production (waterflooding) costs, the method considers one or more of the cost of oil production, cost of water production, cost of water injection, instantaneous flux of water injected during waterflooding, instantaneous flux of water produced during waterflooding, instantaneous flux of oil produced during waterflooding, accumulated volume of water injected after waterflooding, accumulated volume of water produced after waterflooding, and accumulated volume of oil produced after waterflooding.

In determining EOR production costs, the method considers one or more of the cost of oil production, cost of water production, cost of water injection, cost of EOR material, cost of EOR material, target wt % of EOR material, retention rate of EOR material, water density, instantaneous flux of water injected during EOR instantaneous flux of water produced during EOR instantaneous flux of oil produced during EOR accumulated volume of water injected after EOR accumulated volume of water produced after EOR, and accumulated volume of oil produced after EOR.

At block 280, the method provides the production cost information to a user. The information may be provided in tables, graphs, or as a number for each type of production. The method may provide ER costs relative to waterflooding costs and further considering the relative production volumes associated with each method.

In an embodiment, the method evaluates the flux of EOR fluid during injection and determines an indication of formation damage caused by capillary clogging due to the EOR materials. The method identifies regions of the device having zero fluid velocities as potentially clogged regions, and visibly as regions with no change in fluid injection across a span of time and the accompanying image sequence. In this embodiment, the method also provides the user the data associated with the level of formation damage associated with the EOR.

Figure 3:
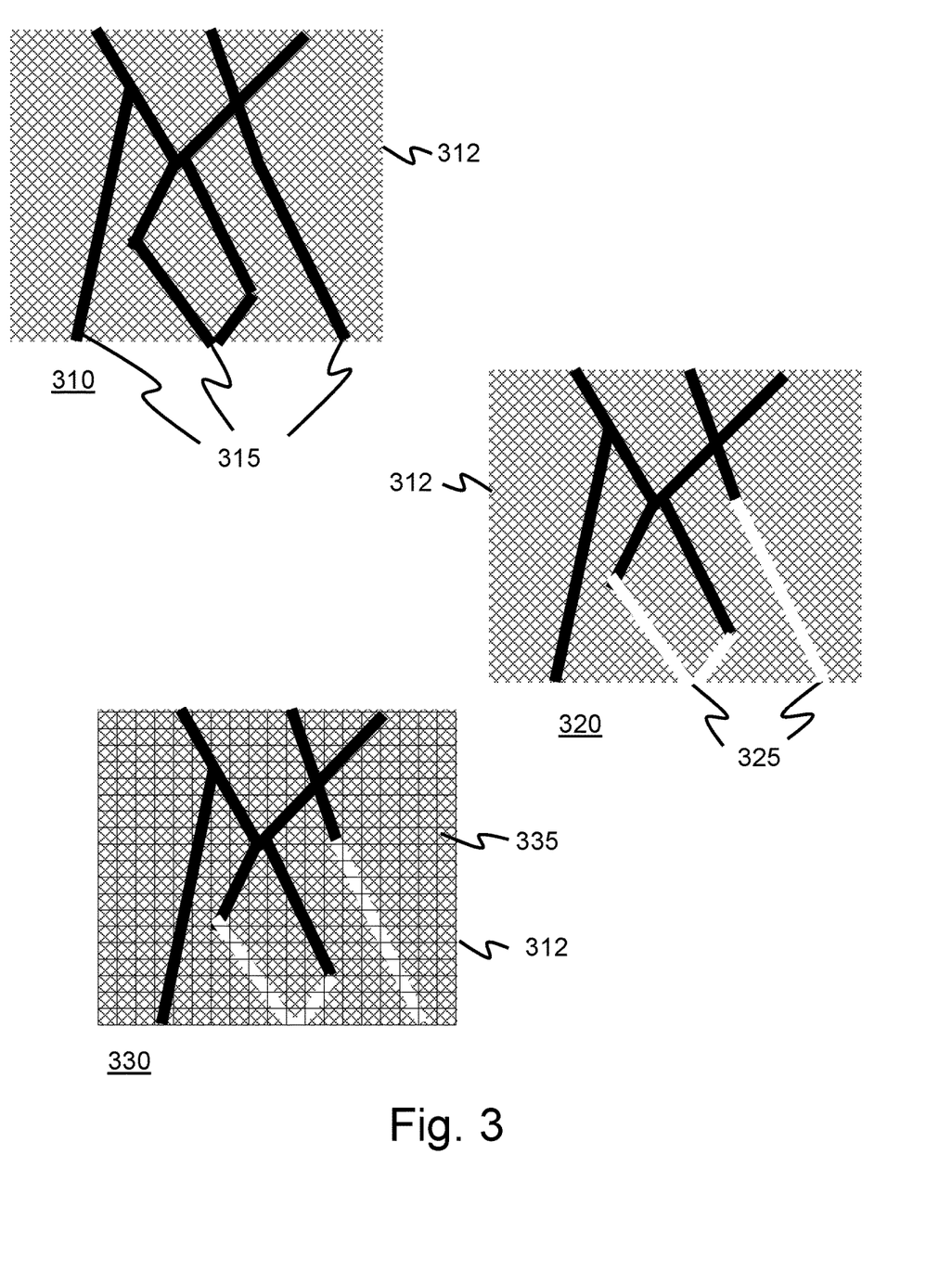
FIG. 3 provides sequential views illustrating steps of the EOR analysis, according to an embodiment of the invention.

FIG. 3 illustrates steps of the disclosed EOR analysis methods. As shown in the Figure, in view 310, rock-on-a-chip slice 312 has its porosity saturated with the target fluid 315. View 320 illustrates the displacement of a portion of the target fluid with the recovery fluid 325 in the porosity of rock-on-a-chip device 312. View 330 illustrates the pixelization 335 of the rock-on-a-chip device 312 for image analysis purposes. After image capture, the method evaluates the image pixels and determines the contrast ratio represented by the target and recovery fluid filled pixels. The method utilizes changes in the contrast ration from one frame to the next, as well as over the sequence of data frames, to calculate fluid velocity fields for the respective fluids and fluid saturation curves for the fluids.

The present invention may be a system, a method, and/or a computer program product at any possible technical detail level of integration with the disclosed nanofluidic devices and fluid injection systems. The invention may be beneficially practiced in any system, single or parallel, which processes an instruction stream to control the devices. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for evaluating enhanced oil recovery methods, the method comprising:
    identifying a first nanofluidic device associated with a reservoir rock formation and saturated with a target fluid;
    directing the injection of a secondary recovery fluid into the first nanofluidic device;
    determining a target fluid secondary recovery saturation level associated with the injection of the secondary recovery fluid into the first nanofluidic device;
    identifying a second nanofluidic device associated with the reservoir rock formation and saturated with the target fluid;
    directing the injection of a tertiary recovery fluid into the second nanofluidic device;
    determining a target fluid tertiary recovery saturation level associated with the injection of the tertiary recovery fluid into the second nanofluidic device;
    determining a target fluid production efficiency associated with the tertiary recovery fluid; and
    providing the target fluid production efficiency to a user.

2. The computer implemented method according to claim 1, further comprising:
    measuring a target fluid flow velocity associated with injecting a recovery fluid into a nanofluidic device; and
    determining a target fluid recovery saturation level for the recovery fluid according to the target fluid flow velocity.

3. The computer implemented method according to claim 1, wherein the first nanofluidic device and the second nanofluidic device are associated with a three-dimensional scan of a reservoir rock.

4. The computer implemented method according to claim 1, further comprising determining target fluid recovery saturation levels using image analysis.

5. The computer implemented method according to claim 1, further comprising:
    determining a target fluid secondary recovery production efficiency associated with the secondary recovery fluid, and
    providing the target fluid secondary recovery production efficiency to the user.

6. The computer implemented method according to claim 1, further comprising:
    determining a target fluid recovery factor associated with the tertiary recovery fluid; and
    providing the target fluid recovery factor to the user.

7. The computer implemented method according to claim 1, further comprising:
    determining a secondary recovery target fluid recovery factor associated with the secondary recovery fluid; and
    providing the secondary recovery target fluid recovery factor to the user.

8. A computer program product for evaluating enhanced oil recovery methods, the computer program product comprising:
    one or more computer readable storage media and program instructions stored on the one or more computer readable storage media, which when executed cause one or more processors to:
    a first nanofluidic device associated with a reservoir rock formation and saturated with a target fluid;
    direct the injection of a secondary recovery fluid into the first nanofluidic device;
    determine a target fluid secondary recovery saturation level associated with the injection of the secondary recovery fluid into the first nanofluidic device;
    identify a second nanofluidic device associated with the reservoir rock formation and saturated with the target fluid;
    direct the injection of a tertiary recovery fluid into the second nanofluidic device;
    determine a target fluid tertiary recovery saturation level associated with the injection of the tertiary recovery fluid into the second nanofluidic device;
    determine a target fluid production efficiency associated with the tertiary recovery fluid; and
    provide the target fluid production efficiency to a user.

9. The computer program product according to claim 8, wherein the stored program instructions, further cause the one or more processors to:
  measure a target fluid flow velocity associated with injecting a recovery fluid into a nanofluidic device; and
  determine a target fluid recovery fluid saturation level for the recovery fluid according to the target fluid flow velocity.

10. The computer program product according to claim 8, wherein the first nanofluidic device and the second nanofluidic device are associated with a three-dimensional scan of a reservoir rock.

11. The computer program product according to claim 8, the stored program instructions further causing the one or more processors to determine a target fluid saturation level using image analysis.

12. The computer program product according to claim 8, wherein the stored program instructions, further cause the one or more processors to:
  determine a target fluid production secondary recovery efficiency associated with the secondary recovery fluid, and
  provide the target fluid secondary recovery production efficiency to the user.

13. The computer program product according to claim 8, wherein the stored program instructions, further cause one or more processors to:
  determine a target fluid tertiary recovery factor associated with the tertiary recovery fluid; and
  provide the target fluid tertiary recovery factor to the user.

14. The computer program product according to claim 8, wherein the stored program instructions, further cause one or more processors to:
  determine a target fluid secondary recovery factor associated with the secondary recovery fluid; and
  provide the target fluid secondary recovery factor to the user.

15. A computer system for evaluating enhanced oil recovery methods, the computer system comprising:
  one or more computer processors;
  one or more computer readable storage devices; and
  stored program instructions on the one or more computer readable storage devices for execution by the one or more computer processors, the stored program instructions comprising:
    program instructions to identify a first nanofluidic device associated with a reservoir rock formation and saturated with a target fluid;
    program instructions to direct the injection of a secondary recovery fluid into the first nanofluidic device;
    program instructions to determine a target fluid secondary recovery saturation level associated with the injection of the secondary recovery fluid into the first nanofluidic device;
    program instructions to identify a second nanofluidic device associated with the reservoir rock formation and saturated with the target fluid;
    program instructions to direct the injection of a tertiary recovery fluid into the second nanofluidic device;
    program instructions to determine a target fluid tertiary recovery saturation level associated with the injection of the tertiary recovery fluid into the second nanofluidic device;
    program instructions to determine a target fluid production efficiency associated with the tertiary recovery fluid; and
    program instructions to provide the target fluid production efficiency to a user.

16. The computer system according to claim 15, the stored program instructions further comprising:
  program instructions to measure a target fluid flow velocity associated with injecting a recovery fluid into a nanofluidic device; and
  program instructions to determine a target fluid recovery fluid saturation level for the recovery fluid according to the target fluid flow velocity.

17. The computer system according to claim 15, the stored program instructions further comprising program instructions to determine a target fluid saturation level using image analysis.

18. The computer system according to claim 15, the stored program instructions further comprising:
  program instructions to determine a target fluid production secondary recovery efficiency associated with the secondary recovery fluid, and
  program instructions to provide the target fluid secondary recovery production efficiency to the user.

19. The computer system according to claim 15, the stored program instructions further comprising:
  program instructions to determine a target fluid tertiary recovery factor associated with the tertiary recovery fluid; and
  program instructions to provide the target fluid tertiary recovery factor to the user.

20. The computer system according to claim 15, the stored program instructions further comprising:
  program instructions to determine a target fluid secondary recovery factor associated with the secondary recovery fluid; and
  program instructions to provide the target fluid secondary recovery factor to the user.

* * * * *